(No Model.)  4 Sheets—Sheet 1.

M. B. BESSEY.
STEAM GENERATOR.

No. 432,854.          Patented July 22, 1890.

Witnesses  
Chas. F. Schmelz,  
H. W. Fowler

Inventor.  
M. B. Bessey,  
By his Attorney (No Model.) 4 Sheets—Sheet 2.
M. B. BESSEY.
STEAM GENERATOR.

No. 432,854. Patented July 22, 1890.

Witnesses
Chas. F. Schmelz
J. A. Rutherford

Inventor
Merritt B. Bessey.
By his Attorney
Alban Andrén.

(No Model.)

4 Sheets—Sheet 3.

M. B. BESSEY.
STEAM GENERATOR.

No. 432,854. Patented July 22, 1890.

Witnesses

Inventor
M. B. Bessey
By his Attorney (No Model.) 4 Sheets—Sheet 4.
M. B. BESSEY.
STEAM GENERATOR.
No. 432,854. Patented July 22, 1890.
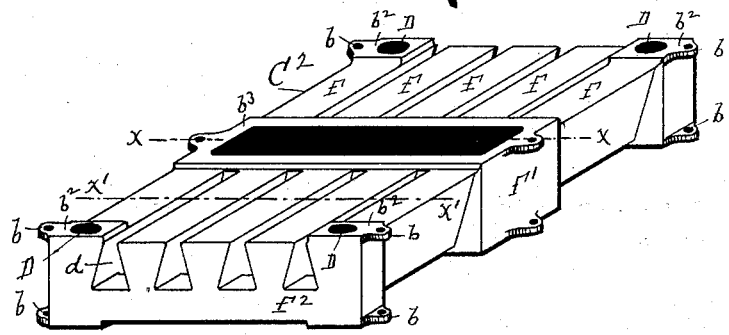
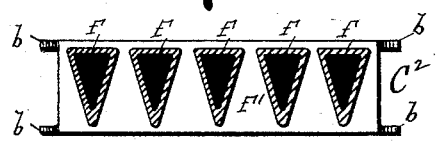
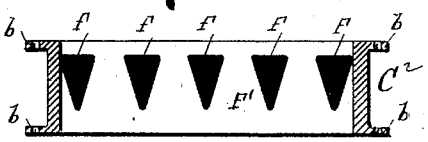
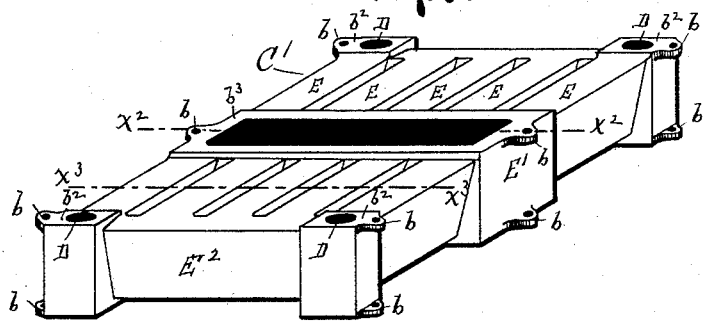
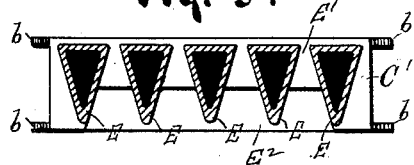
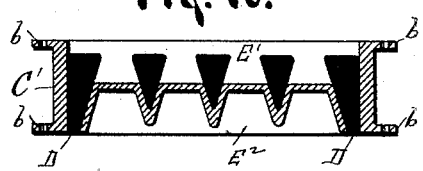
Witnesses
Henry Hef.
Henry Wood
Inventor
M. B. Bessey
By his Attorney
Rufus B. Fowler

UNITED STATES PATENT OFFICE.

MERRITT B. BESSEY, OF WORCESTER, MASSACHUSETTS.

STEAM-GENERATOR.

SPECIFICATION forming part of Letters Patent No. 432,854, dated July 22, 1890.

Application filed April 7, 1886. Serial No. 198,046. (No model.)

*To all whom it may concern:*

Be it known that I, MERRITT B. BESSEY, a citizen of the United States, residing at Worcester, in the county of Worcester and State of Massachusetts, have invented certain new and useful Improvements in Steam-Generators, of which the following is a specification, reference being had to the accompanying drawings, in which—

Figure 1:
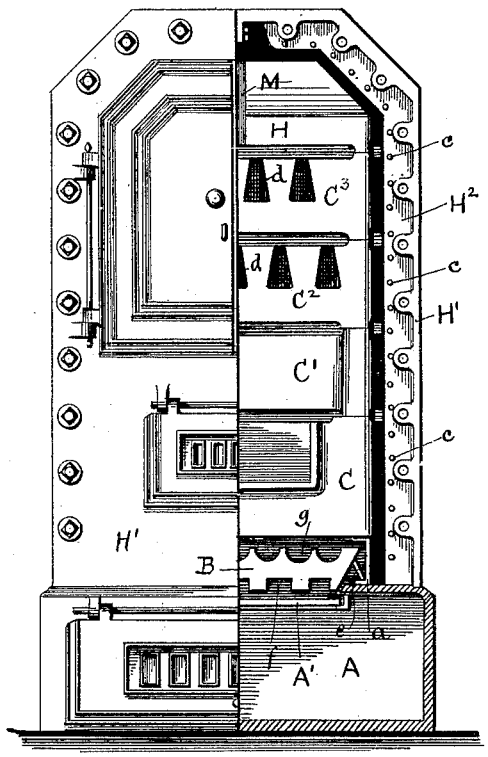
Figure 2:
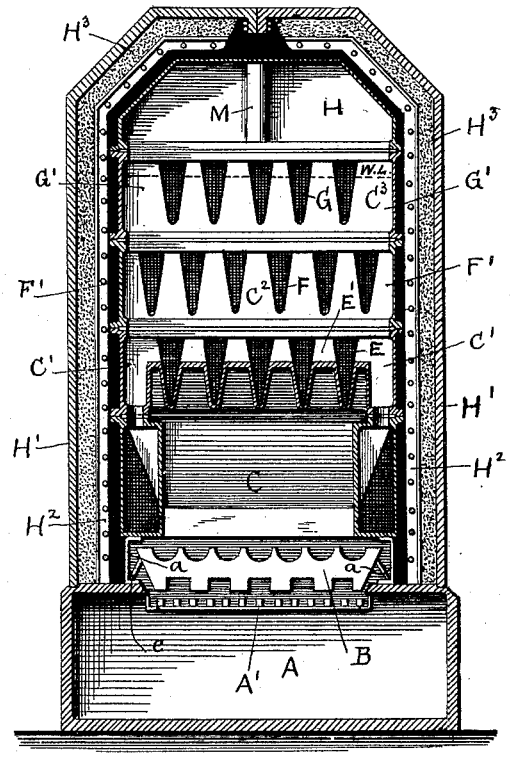
Figure 3:
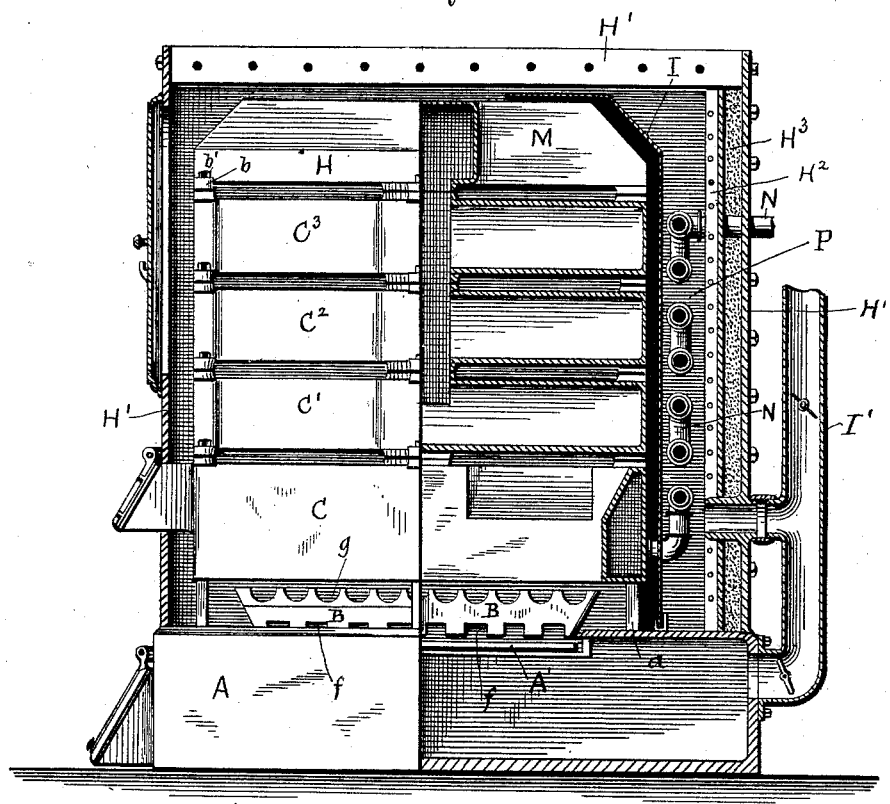
Figure 4:
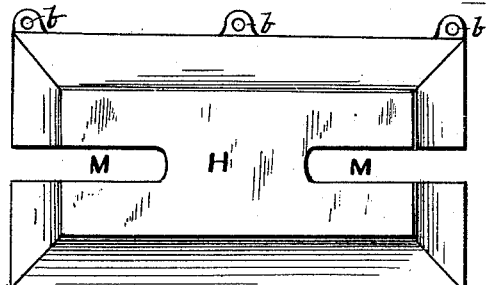
Figure 5:
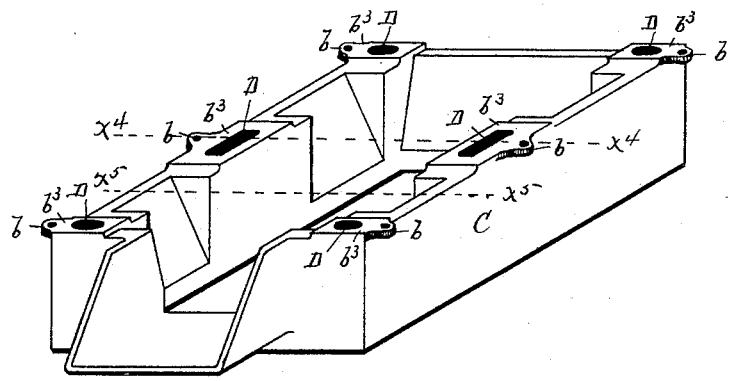
Figure 6:
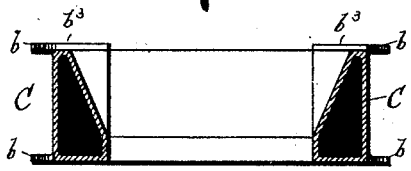
Figure 7:
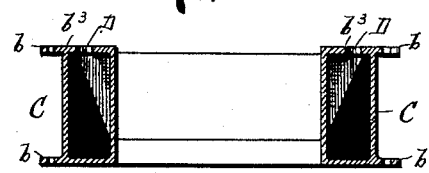

Figure 1 represents a front elevation of a steam-generator embodying my invention, one-half being shown with the case removed. Fig. 2 is a vertical transverse sectional view through the center. Fig. 3 is a side view, one half showing the case removed, the other or right-hand half showing a vertical sectional view through the center. Fig. 4 is a plan of steam-dome. Fig. 5 is a perspective view of section C. Fig. 6 is a transverse sectional view of section C on line $X^5 X^5$, Fig. 5. Fig. 7 is a transverse sectional view on line $X^4 X^4$, Fig. 5. Fig. 8 is a perspective view of section C'. Fig. 9 is a transverse sectional view of section C' on line $X^3 X^3$, Fig. 7. Fig. 10 is a transverse sectional view of section C' on line $X^2 X^2$, Fig. 7. Fig. 11 is a perspective view of section $C^2$. Fig. 12 is a transverse sectional view of section $C^2$ on line X' X', Fig. 11. Fig. 13 is a transverse sectional view of section $C^2$ on line X X, Fig. 11.

Similar letters refer to similar parts in the several views.

My invention relates to a steam-generator designed for warming buildings; and it consists in the construction and arrangement of parts, as hereinafter described, and specifically set forth in the claims.

Referring to the drawings, A denotes an ash-box, A' the grate, and B the fire-pot, above which I place as the first "section" an iron shell C in the form of a rectangular frame resting upon legs $a$, which stand upon the top of the ash-box A. Above this shell C, I place the second section C', which consists of a series of longitudinal triangular shells E, with their apices downward and each communicating with a central transverse chamber E', which extends from the top of the shells E downward about one-third to one-half the depth of the shells E, as seen in Fig. 2, allowing the shells E to fall below the central chamber in order to increase the heating-surface exposed to the fire. Above section C', I place the third and fourth sections $C^2$ and $C^3$ similarly composed of triangular shells F and G, arranged longitudinally in parallel rows with their apices downward and communicating with central chambers F' and G', whose vertical section equals that of the shells F and G. Section $C^3$ is identical with section $C^2$, except that the triangular tubes G are brought over the spaces between the tubes in section $C^2$, and therefore I have not deemed it necessary to show section $C^3$ in perspective view. Above section $C^3$, I place a chamber or steam-dome H, with each of its vertical sides re-entering a short distance, as at M, Fig. 4, to increase the surface exposed to the heat.

Transverse chambers $E^2$ unite the ends of the shells E in section C', and transverse chambers $F^2$ unite the ends of the shells F in sections $C^2$. The chambers $F^2$ are, however, of less vertical height than the connected triangular shells F, leaving openings $d$, Fig. 1, through which the heating-surfaces may be cleaned. As before stated, the section $C^3$ is formed exactly like section $C^2$ and the same description applies thereto. Bosses are placed upon the opposing surfaces of sections C and C' at each corner and midway upon each side, separating the sections a short distance to allow the heat to pass through, and also limiting the surface in contact. Through each of these bosses are openings, forming ways D and water communication between the rectangular frame C and section C'.

Water communication is similarly secured between the sections C', $C^2$, and $C^3$, and in addition the central transverse chambers E', F', and G' open into each other for nearly their entire area, and a projecting rib is formed around each opening, whose opposing surfaces form a water-tight joint. The under side of the steam-dome H also communicates with the section $C^3$ at the corners and at the central transverse chamber G'.

Projecting from the sides of the dome H and the several sections are lugs $b$, having bolts $b'$, by which the surfaces in contact are securely drawn together to prevent the escape of water or steam. If desired, a gasket of asbestus may be intervened. The triangular shells of each section are placed opposite a space in the section immediately beneath, so as to allow the heat as it rises through each space to impinge directly against the under surface of the shell above it.

The entire structure of sections and dome are surrounded by a case H', resting on the ash-box and having a series of internal ribs H², arranged in parallel rows a short distance apart, between which I pack asbestos, mineral wool, or some similar heat-non-conducting material H³. Strips of sheet metal placed over this packing and held by pins c, Fig. 1, serve to retain it in position.

At the rear of the sections, I place a perpendicular partition I, resting on the ash-box and extending nearly to the top of the case H' and forming a downward flue leading to the smoke-pipe I'. Steam-pipes are taken from any convenient place on the steam-dome H, and the return-pipe N is carried through a coil placed in the downward flue, in order to heat the feed-water before it enters the bottom of section C.

The several sections may readily be cast each in a single piece and the interior water-space formed by coring, and the surfaces in contact being limited to a small space around each opening water-tight joints are secured without expensive fitting. Water is brought nearly to the top of section C³, leaving the dome H to contain only steam, which becomes superheated.

The fire-pot B consists of inclined plates supported by the braces e, resting on the top of the ash-box A. Openings along the lower edge of the fire-pot admit air, and the openings g at the upper edge permit free passage of heated air beneath section C. The plates forming the fire-pot may readily be removed and new ones substituted. The triangular shape of the longitudinal shells I consider preferable, but other forms may be used.

In operation the water contained in the large central space formed by the transverse chambers E', F', and G' is heated the fastest, being directly over the center and hottest portion of the fire, causing an upward current of water toward the top of the central chamber, which passes laterally through the triangular shells to the ends or cooler portions and descends through the corner water-ways, flowing to the center at the bottom to be again reheated and resume its upward and outward circulation. I thus secure by the peculiar form of sections not only a large heating-surface, but also the active circulation of all the water contained over the heating-surface.

What I claim as my invention, and desire to secure by Letters Patent, is—

1. In a steam-generator, the combination, with an ash-box, a water-receptacle above the ash-box, and an inclosing-case for both, of a fire-pot between the ash-box and water-receptacle, consisting of removable inclined plates having openings g, and supported from the ash-box by the braces e, substantially as described.

2. In a steam-generator, the combination, with a fire-pot, of a hollow frame C, and sections C', C², and C³, each having a central transverse chamber, and longitudinal shells or pipes, said shells or pipes having a water communication with each other by a common chamber, as described.

3. In a steam-generator, the water-holding sections C' C² C³, having central transverse chambers, connected end chambers, and horizontal triangular pipes connecting the central and end chambers, substantially as described.

4. In a steam-generator, the steam-dome consisting of a shell whose sides re-enter, as at M, and form spaces for the purpose of increasing the heating-surface, as described.

M. B. BESSEY.

Witnesses:
RUFUS B. FOWLER,
D. W. CARTER.